US 8,112,204 B2

(12) United States Patent
Yamada et al.

(10) Patent No.: US 8,112,204 B2
(45) Date of Patent: Feb. 7, 2012

(54) AUTOMATIC TRANSMISSION CONTROLLER AND AUTOMATIC TRANSMISSION CONTROL METHOD

(75) Inventors: Naohiro Yamada, Atsugi (JP); Tukasa Hayashi, Isehara (JP)

(73) Assignee: JATCO Ltd, Fuji (JP)

( * ) Notice: Subject to any disclaimer, the term of this patent is extended or adjusted under 35 U.S.C. 154(b) by 515 days.

(21) Appl. No.: 12/400,150

(22) Filed: Mar. 9, 2009

(65) Prior Publication Data

US 2009/0248233 A1  Oct. 1, 2009

(30) Foreign Application Priority Data

Mar. 28, 2008  (JP) ................................ 2008-085122

(51) Int. Cl.
*G06F 7/04* (2006.01)

(52) U.S. Cl. ........................................... 701/51; 477/34

(58) Field of Classification Search .................... 701/51, 701/29; 477/34
See application file for complete search history.

(56) References Cited

U.S. PATENT DOCUMENTS

| | | |
|---|---|---|
| 4,843,915 A | 7/1989 | Sugimura et al. |
| 5,562,570 A | 10/1996 | Nakashima |
| 5,857,937 A | 1/1999 | Ashizawa et al. |
| 6,030,313 A * | 2/2000 | Sawada et al. ................ 477/46 |
| 6,931,316 B2 * | 8/2005 | Joe et al. ........................ 701/61 |
| 7,575,092 B2 * | 8/2009 | Endo et al. .................... 180/446 |

FOREIGN PATENT DOCUMENTS

| | | |
|---|---|---|
| EP | 1 903 262 A1 | 3/2008 |
| FR | 2 834 034 A1 | 6/2003 |
| JP | 63-318353 A | 12/1988 |
| JP | 07-269693 A | 10/1995 |
| JP | 08-042680 A | 2/1996 |
| JP | 9-210159 A | 8/1997 |
| JP | 09-269061 A | 10/1997 |

* cited by examiner

*Primary Examiner* — Paul N Dickson
*Assistant Examiner* — Nicole Verley
(74) *Attorney, Agent, or Firm* — Foley & Lardner LLP

(57) ABSTRACT

An automatic transmission controller calculates a predicted vehicle speed with reference to a measured vehicle state variable, and calculates a target transmission ratio with reference to the predicted vehicle speed, when a sensor input signal is normal which carries information about the measured vehicle state variable. The automatic transmission controller calculates the predicted vehicle speed with reference to a first alternative value instead of the measured vehicle state variable, and calculates the target transmission ratio with reference to a second alternative value instead of the predicted vehicle speed, when the sensor input signal is abnormal. The automatic transmission controller restarts calculation of the predicted vehicle speed with reference to the measured vehicle state variable, when the sensor input signal becomes normal, and restarts calculation of the target transmission ratio with reference to the predicted vehicle speed, when a predetermined condition is satisfied after the sensor input signal becomes normal.

15 Claims, 5 Drawing Sheets

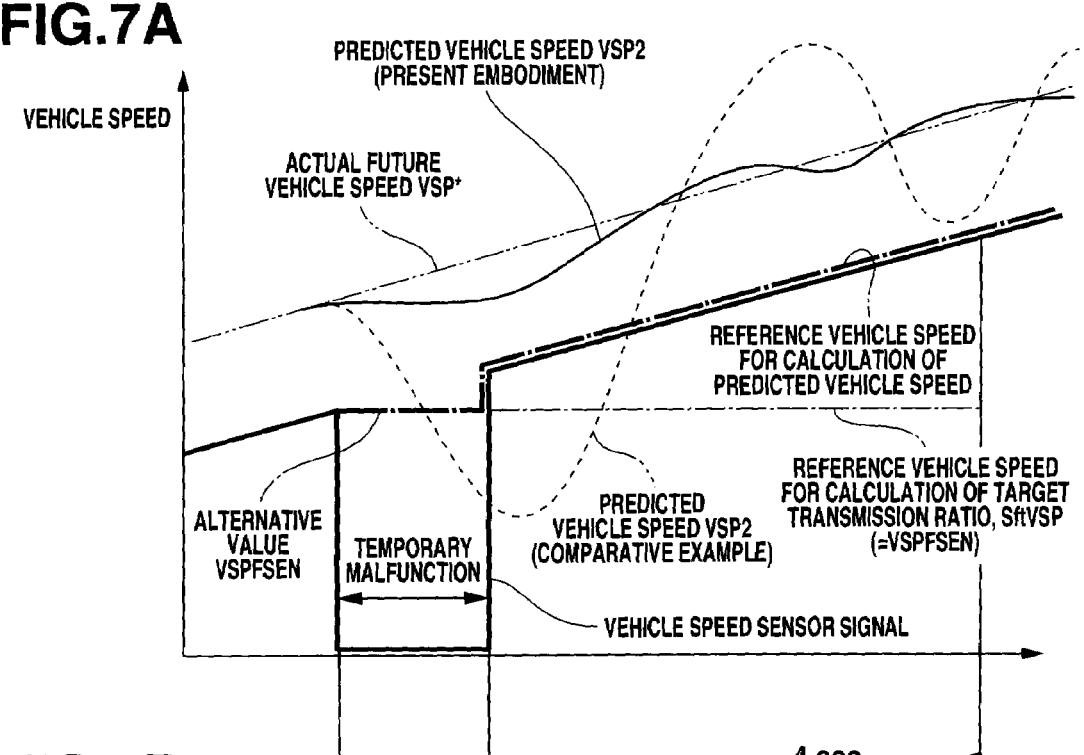

AUTOMATIC TRANSMISSION CONTROLLER AND AUTOMATIC TRANSMISSION CONTROL METHOD

BACKGROUND OF THE INVENTION

The present invention relates to automatic transmission controllers and automatic transmission control methods for controlling a transmission ratio with reference to a predicted vehicle speed.

Japanese Patent Application Publication No. 9-210159 discloses a technique of controlling a transmission ratio with reference to a predicted vehicle speed which is an estimated value of a future vehicle speed a predetermined time period after a current time instant.

SUMMARY OF THE INVENTION

Such an automatic transmission system as disclosed in Japanese Patent Application Publication No. 9-210159 may encounter a problem that a sensor input signal becomes abnormal which is referred to for calculation of a predicted vehicle speed. The abnormality may be caused in cases where a sensor is broken completely, or in cases where the sensor temporarily fails to output a signal due to poor contact. This problem may result in incorrect calculation of the predicted vehicle speed, and then unnecessary rapid upshifts and downshifts.

In view of the foregoing, it is desirable to provide an automatic transmission controller and an automatic transmission control method which are capable of performing a suitable shift control even when a sensor input signal becomes abnormal which is referred to for calculation of a predicted vehicle speed.

According to one aspect of the present invention, an automatic transmission controller for an automatic transmission, comprises: a sensor input state evaluator configured to determine whether a sensor input signal is normal or abnormal, wherein the sensor input signal carries information about a measured vehicle state variable; a vehicle speed calculator configured to: calculate a predicted vehicle speed with reference to the measured vehicle state variable, in response to determination that the sensor input signal is normal; calculate the predicted vehicle speed with reference to a first alternative value instead of the measured vehicle state variable, in response to determination that the sensor input signal is abnormal; and calculate the predicted vehicle speed with reference to the measured vehicle state variable, in response to determination that the sensor input signal becomes normal after abnormal; a target transmission ratio calculator configured to: calculate a target transmission ratio with reference to the predicted vehicle speed, in response to determination that the sensor input signal is normal; calculate the target transmission ratio with reference to a second alternative value instead of the predicted vehicle speed, in response to determination that the sensor input signal is abnormal; calculate the target transmission ratio with reference to the second alternative value instead of the predicted vehicle speed, in response to determination that a predetermined condition is unsatisfied after the sensor input signal becomes normal after abnormal; and calculate the target transmission ratio with reference to the predicted vehicle speed, in response to determination that the predetermined condition is satisfied after the sensor input signal becomes normal after abnormal; and a transmission ratio controller configured to control the automatic transmission with reference to the target transmission ratio. The automatic transmission controller may be configured so that: the sensor input state evaluator is configured to determine whether the sensor input signal as a first sensor input signal is normal or abnormal, and determine whether a second sensor input signal is normal or abnormal, wherein the first sensor input signal carries information about the measured vehicle state variable as a first measured vehicle state variable, and the second sensor input signal carries information about a second measured vehicle state variable; the vehicle speed calculator is configured to: calculate the predicted vehicle speed with reference to the first measured vehicle state variable and the second measured vehicle state variable, in response to determination that the first sensor input signal and the second sensor input signal are normal; calculate the predicted vehicle speed with reference to a third alternative value instead of the second measured vehicle state variable, in response to determination that the second sensor input signal is abnormal; and calculate the predicted vehicle speed with reference to the second measured vehicle state variable, in response to determination that the second sensor input signal becomes normal after abnormal; and the target transmission ratio calculator is configured to: calculate the target transmission ratio with reference to the predicted vehicle speed, in response to determination that the first sensor input signal and the second sensor input signal are normal; calculate the target transmission ratio with reference to the second alternative value instead of the predicted vehicle speed, in response to determination that the second sensor input signal is abnormal; calculate the target transmission ratio with reference to the second alternative value instead of the predicted vehicle speed, in response to determination that a second predetermined condition is unsatisfied after the second sensor input signal becomes normal after abnormal; and calculate the target transmission ratio with reference to the predicted vehicle speed, in response to determination that the second predetermined condition is satisfied after the second sensor input signal becomes normal after abnormal.

According to another aspect of the present invention, an automatic transmission controller for an automatic transmission, comprises: sensor input state evaluation means for determining whether a sensor input signal is normal or abnormal, wherein the sensor input signal carries information about a measured vehicle state variable; vehicle speed calculation means for: calculating a predicted vehicle speed with reference to the measured vehicle state variable, in response to determination that the sensor input signal is normal; calculating the predicted vehicle speed with reference to a first alternative value instead of the measured vehicle state variable, in response to determination that the sensor input signal is abnormal; and calculating the predicted vehicle speed with reference to the measured vehicle state variable, in response to determination that the sensor input signal becomes normal after abnormal; target transmission ratio calculation means for: calculating a target transmission ratio with reference to the predicted vehicle speed, in response to determination that the sensor input signal is normal; calculating the target transmission ratio with reference to a second alternative value instead of the predicted vehicle speed, in response to determination that the sensor input signal is abnormal; calculating the target transmission ratio with reference to the second alternative value instead of the predicted vehicle speed, in response to determination that a predetermined condition is unsatisfied after the sensor input signal becomes normal after abnormal; and calculating the target transmission ratio with reference to the predicted vehicle speed, in response to determination that the predetermined condition is satisfied after the sensor input signal becomes normal after abnormal; and transmission ratio control means for controlling the automatic transmission with reference to the target transmission ratio.

According to a further aspect of the present invention, an automatic transmission control method for an automatic transmission, comprises: determining whether a sensor input signal is normal or abnormal, wherein the sensor input signal carries information about a measured vehicle state variable; calculating a predicted vehicle speed with reference to the measured vehicle state variable, in response to determination that the sensor input signal is normal; calculating the predicted vehicle speed with reference to a first alternative value instead of the measured vehicle state variable, in response to determination that the sensor input signal is abnormal; calculating the predicted vehicle speed with reference to the measured vehicle state variable, in response to determination that the sensor input signal becomes normal after abnormal; calculating a target transmission ratio with reference to the predicted vehicle speed, in response to determination that the sensor input signal is normal; calculating the target transmission ratio with reference to a second alternative value instead of the predicted vehicle speed, in response to determination that the sensor input signal is abnormal; calculating the target transmission ratio with reference to the second alternative value instead of the predicted vehicle speed, in response to determination that a predetermined condition is unsatisfied after the sensor input signal becomes normal after abnormal; calculating the target transmission ratio with reference to the predicted vehicle speed, in response to determination that the predetermined condition is satisfied after the sensor input signal becomes normal after abnormal; and controlling the automatic transmission with reference to the target transmission ratio.

BRIEF DESCRIPTION OF THE DRAWINGS

FIGS. 7A, 7B, 7C and 7D are time charts showing an example of how the automatic transmission controller operates when a temporarily malfunction occurs in the vehicle speed sensor.

DETAILED DESCRIPTION OF THE INVENTION

Figure 1:
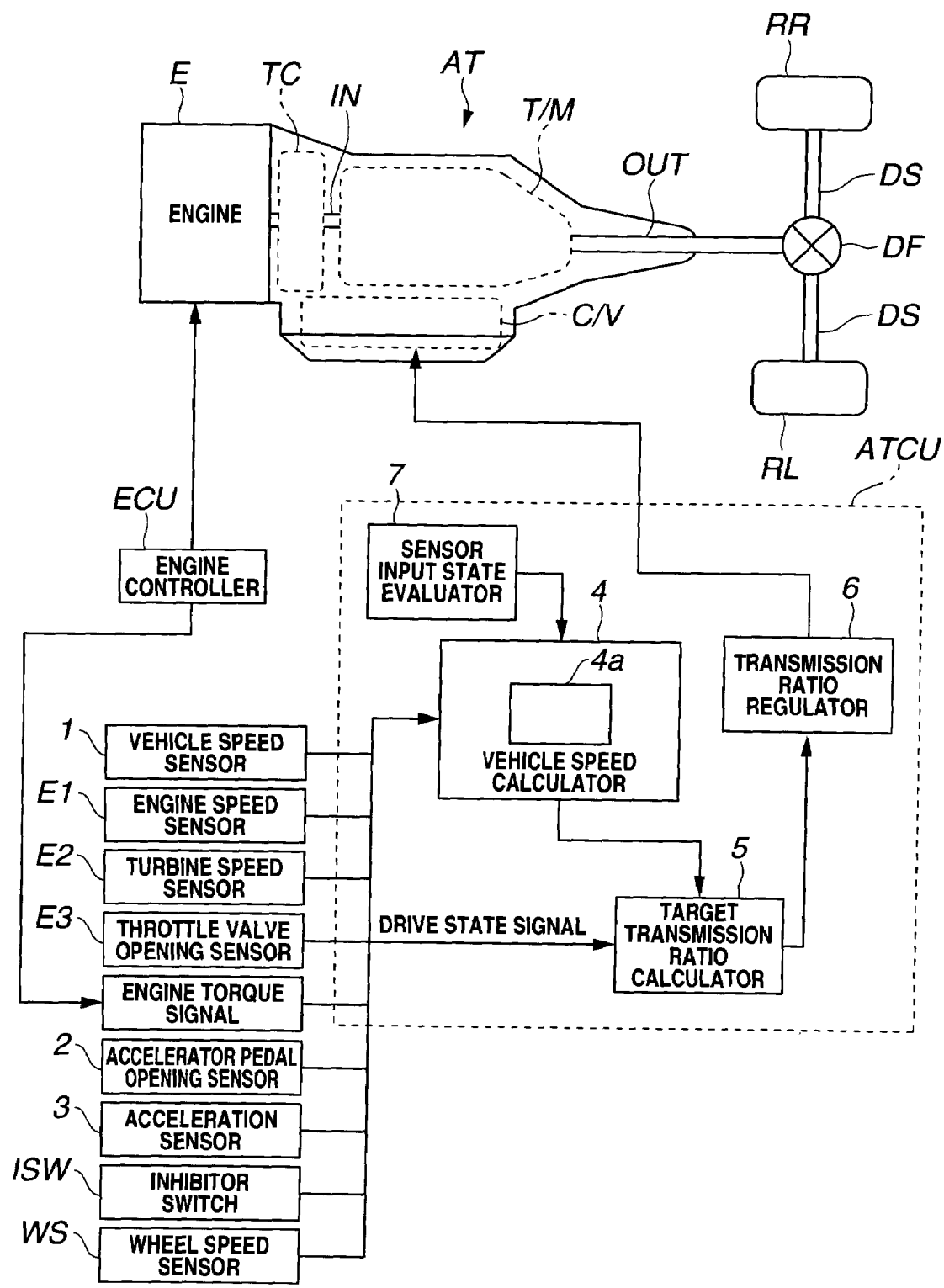
FIG. 1 is a schematic diagram showing system configuration of an automotive vehicle provided with an automatic transmission controller according to an embodiment of the present invention.

FIG. 1 schematically shows system configuration of an automotive vehicle provided with an automatic transmission controller according to an embodiment of the present invention. The automotive vehicle is a rear wheel drive vehicle in this example, but not so limited. The automotive vehicle may be an alternative vehicle, such as a front wheel drive vehicle, or a four wheel drive vehicle.

The automotive vehicle includes an engine "E", a torque converter "TC", and an automatic transmission "AT". Engine E outputs a driving torque, which is transmitted through torque converter TC to an input shaft "IN" of automatic transmission AT. Automatic transmission AT includes a plurality of planetary gears and a plurality of engaging elements in a housing. In automatic transmission AT, the driving torque is shifted by a transmission ratio which is established according to combination of engagement or disengagement of the engaging elements. The shifted driving torque is outputted from automatic transmission AT through an output shaft "OUT" to a differential gear "DF". Differential gear DF distributes the driving torque to left and right drive shafts "DS", "DS", and then to left and right rear wheels "RL", "RR".

Automatic transmission AT is configured to set a transmission ratio according to vehicle driving state, shift (increase or reduce) an input rotational speed from input shaft IN by the transmission ratio, and output the shifted rotational speed to output shaft OUT. Automatic transmission AT provides five forward transmission ratios and one reverse transmission ratio in this example.

Automatic transmission AT further includes one-way clutches not shown, an oil pump not shown, and a control valve unit "C/V". Control valve unit C/V regulates engaging pressures, and supplies the regulated engaging pressures to the engaging elements. An overall gear ratio of the planetary gears are determined according to combination of engagement or disengagement of the engaging elements for establishing a selected one of the transmission ratios.

During a shifting process, an engaging element changeover operation is carried out in automatic transmission AT, in which a first engaging element, which is engaged for establishment of a prior transmission ratio, is gradually disengaged, and a second engaging element, which is engaged for establishment of a preceding transmission ratio, is gradually engaged.

An engine controller "ECU" is configured to control the rotational speed and output torque of engine E according to input information by adjusting the opening of a throttle valve "TVO", fuel injection quantity, ignition timing, intake air quantity, exhaust gas quantity, etc.

An automatic transmission controller "ATCU" is configured to select one of the transmission ratios of automatic transmission AT according to input information indicative of vehicle driving state, and output control signals to actuators for establishing the selected transmission ratio.

Automatic transmission controller ATCU includes a vehicle speed calculator 4 for calculating a reference vehicle speed for calculation of a target transmission ratio. Vehicle speed calculator 4 includes a vehicle speed estimator 4a for calculating a predicted vehicle speed "VSP2" which is defined as an estimated vehicle speed at a future time instant after a predetermined time period. Vehicle speed calculator 4 outputs one of predicted vehicle speed VSP2, a weighted vehicle speed "VSP0", a measured vehicle speed "VSP", an alternative value VSPFSEN, and a secondary measured vehicle speed "VI", as a reference vehicle speed "SftVSP", as described in detail below.

Automatic transmission controller ATCU further includes a target transmission ratio calculator 5, a transmission ratio regulator 6, and a sensor input state evaluator 7. Target transmission ratio calculator 5 calculates the target transmission ratio according to input signals indicative of various parameters of vehicle driving state including reference vehicle speed SftVSP. Transmission ratio regulator 6 regulates the engaging elements between an engaged state and a disengaged state according to the calculated target transmission ratio. Sensor input state evaluator 7 evaluates whether a sensor input signal outputted from a vehicle speed sensor 1 is normal or abnormal. Specifically, sensor input state evaluator 7 evaluates that a first level malfunction is present in vehicle speed sensor 1, when the sensor input signal from vehicle speed sensor 1 is absent for a short time period such as 0.1 second. Sensor input state evaluator 7 evaluates that a second level malfunction is present in vehicle speed sensor 1, when the sensor input signal from vehicle speed sensor 1 is absent for a longer time period such as 3 seconds.

Automatic transmission controller ATCU receives signals from sensors, which are indicative of an operating state of the vehicle. The sensors include vehicle speed sensor 1 for measuring a current actual vehicle speed as measured vehicle speed VSP, an accelerator pedal opening sensor 2 for measuring an accelerator pedal opening "APO", an acceleration sensor 3 for measuring an acceleration of the vehicle, an engine speed sensor "E1" for measuring engine speed, a turbine speed sensor "E2" for measuring the rotational speed of input shaft IN, a throttle valve opening sensor "E3" for measuring throttle valve opening. Automatic transmission controller ATCU also receives a signal from engine controller ECU, where the signal is indicative of an estimated output torque of engine E which is calculated by engine controller ECU. Automatic transmission controller ATCU further receives a signal from a wheel speed sensor "WS", where the signal is indicative of secondary measured vehicle speed VI which is also referred to in other control systems provided in the automotive vehicle such as an antilock brake system. is Secondary measured vehicle speed VI is the average or the smaller one of wheel speeds of non-driving wheels.

An inhibitor switch "ISW" is a device for outputting signals indicative of drive ranges, a neutral range (N), and a parking range (P). The drive ranges include forward drive ranges (D, L, 1, 2, etc.), and a reverse drive range (R).

Figure 2:
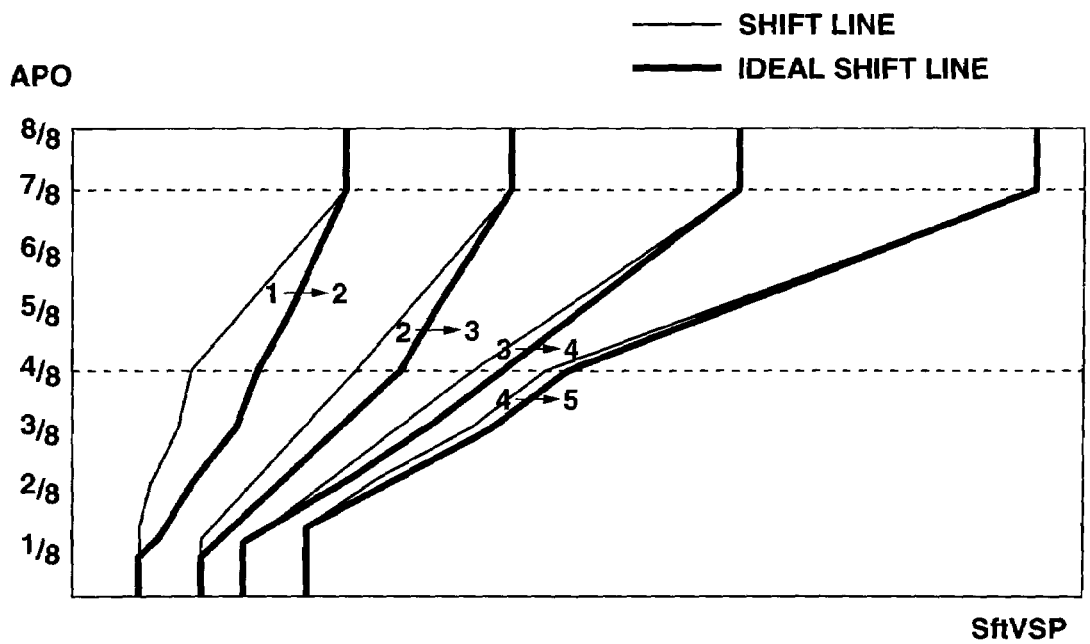
FIG. 2 is a graphic diagram showing a shift map stored in a transmission ratio regulator of the automatic transmission controller.

FIG. 2 graphically shows a shift map which is set and stored in target transmission ratio calculator 5. In the shift map, the horizontal axis indicates reference vehicle speed SftVSP, and the vertical axis indicates accelerator pedal opening APO. A point in the shift map which is defined by a combination of reference vehicle speed SftVSP and accelerator pedal opening APO is referred to as operating point. The operating point moves as the vehicle speed and accelerator pedal opening APO change. In the shift map, bold solid lines indicate ideal shift lines, and narrow solid lines, on the left side of the ideal shift lines, indicate shift lines. For example, when the vehicle speed increases from zero under condition that accelerator pedal opening APO is equal to $3/8$, the operating point moves from a region of the first transmission ratio to a region of the second transmission ratio beyond a first to second shift line. In response, an upshift is carried out, and completed when the operating point reaches a first to second ideal shift line. The relationship between shift line and ideal shift line is explained in detail below.

In a region of the shift map where accelerator pedal opening APO is small, the ideal shift lines are defined close to each other, so as to cause upshifts at early timings. On the other hand, in a region of the shift map where accelerator pedal opening APO is large, the ideal shift lines are located at greater intervals, so as to maintain selected transmission ratios until later timings.

For practical use, downshift lines, coast drive control lines, slip lockup control lines may be set in the shift map, but are omitted in this description. Downshift lines are usually located on the lower vehicle speed side of upshift lines, so as to prevent shift hunching, but this description is based on assumption that the shift lines indicate both of upshift lines and downshift lines, for ease of understanding.

The shift map is defined to contain three regions which are arranged in the vertical axis of accelerator pedal opening APO, as shown in FIG. 2. The area where accelerator pedal opening APO is from 0 to $4/8$ ($0 \leq APO < 4/8$) is referred to as standard control area in which measured vehicle speed VSP obtained by vehicle speed sensor 1 is used as reference vehicle speed SftVSP for shift control. The area where accelerator pedal opening APO is from $7/8$ to $8/8$ ($7/8 \leq APO$) is referred to as predictive control area in which predicted vehicle speed VSP2 is used as reference vehicle speed SftVSP for shift control. The area where accelerator pedal opening APO is from $4/8$ to $7/8$ ($4/8 \leq APO < 7/8$) is referred to as intermediate control area in which weighted vehicle speed VSP0 is used as reference vehicle speed SftVSP for shift control. Weighted vehicle speed VSP0 is determined between measured vehicle speed VSP and predicted vehicle speed VSP2 according to accelerator pedal opening APO.

In the standard control area, a shift command is issued, when measured vehicle speed VSP passes each shift line. Each shift line in the standard area is predefined based on the corresponding ideal shift line so that the shift is started when the operating point passes the shift line, and the shift is completed when the operating point reaches the ideal shift line. In the area where accelerator pedal opening APO is from zero to $1/8$, each shift line is set at the same location as the corresponding ideal shift line, because the shift takes little time.

In the intermediate control area, a shift command is issued, when weighted vehicle speed VSP0 passes each shift line. Weighted vehicle speed VSP0 is determined between measured vehicle speed VSP and predicted vehicle speed VSP2 according to accelerator pedal opening APO. Specifically, weighted vehicle speed VSP0 is calculated using the following equation.

$$VSP0 = VSP2\{(APO - 4/8)/(3/8)\} + VSP\{(7/8 - APO)/(3/8)\}$$

If a shift command is issued when weighted vehicle speed VSP0 exceeds a shift line, the shift is completed when the operating point reaches the corresponding ideal shift line.

In the intermediate control area, each shift line is defined by a straight line connecting a first point and a second point, wherein the first point is a point on the ideal shift line at accelerator pedal opening APO=$7/8$, and the second point is a point on the shift line at accelerator pedal opening APO=$4/8$.

In this way, in the intermediate control area, when accelerator pedal opening APO is relatively large, each shift line is set closer to the ideal shift line, because weighted vehicle speed VSP0 is constituted by a large part of predicted vehicle speed VSP2 and a small part of measured vehicle speed VSP. On the other hand, when accelerator pedal opening APO is relatively small, each shift line is set closer to the shift line for the case where measured vehicle speed VSP is used as reference vehicle speed SftVSP in the standard control area, because weighted vehicle speed VSP0 is constituted by a small part of predicted vehicle speed VSP2 and a large part of measured vehicle speed VSP.

The provision of the intermediate control area based on weighted vehicle speed VSP0 is effective for smoothing shifts between the predictive control area and the standard control area.

In the predictive control area, each shift line is located at the same position as the corresponding ideal shift line. A shift command is issued, when a predicted operating point, which indicates a future driving state and is defined by predicted vehicle speed VSP2, passes each shift line. The shift is completed when the actual operating point reaches the ideal shift line at a future timing.

The following describes the relationship between shift line and ideal shift line. As described above, in automatic transmission AT, shifts are implemented by engaging or disengaging the engaging elements. During a shift, a first engaging element is set disengaged, and a second engaging element is set engaged.

A typical shifting operation is composed of a precharge phase, a torque phase, an inertia phase, and a completion phase. The precharge phase is a phase in which a clearance is eliminated in the second engaging element which is to be engaged. The torque phase is a phase in which the engaging pressure of the first engaging element to be disengaged is slightly reduced, and an engaging pressure is supplied to the second engaging element. The inertia phase is a phase in which the engaging pressure of the first engaging element is reduced, and the engaging pressure of the second engaging element is increased, so as to promote a change in transmission ratio. The completion phase is a phase in which after a suitable change in transmission ratio is completed, the engaging pressure of the second engaging element is increased to a full engaging pressure.

When an input torque to automatic transmission AT is large, a shift requires much time, especially for the inertia phase. In general, the shift time increases as the input torque increases. In other words, shifting operation is accompanied by delay factors such as delays due to mechanical response, and delays due to input torque.

On the other hand, it is known that range setting for transmission ratios may affect drivability. Especially for rhythmical upshifts, it is preferable to complete shifts at certain timings. These preferable timings constitute ideal shift lines.

If a shift is started when the operating point reaches an ideal shift line, the shift is completed apart from the ideal shift line, due to the delay factors described above. Accordingly, a shift line is set apart from the ideal shift line, so that the shift is actually completed on the ideal shift line.

The following describes calculation of predicted vehicle speed VSP2. As described above, the shift lines are defined on the basis of the ideal shift lines, but not in full consideration of influences of actual driving conditions. For example, in cases where the vehicle is subject to high load, even when accelerator pedal opening APO is large, it may take more time to reach an ideal shift line. On the other hand, in cases where the vehicle is subject to low load, it may take less time to reach the ideal shift line. In order to respond to various driving conditions, it is preferable to measure additional parameters concerning driving conditions, and set and store a plurality of shift line sets depending on the parameters. This may lead to a complicated shift control logic and a large necessary memory size.

In consideration of the foregoing, it is preferable to suitably determine when to start shifts. This is important, especially when accelerator pedal opening APO is large in which the shifting time tends to be long.

In this embodiment, automatic transmission controller ATCU calculates predicted vehicle speed VSP2 on the basis of measured vehicle speed VSP obtained by vehicle speed sensor 1, and implements a shift control with reference to a relationship between the predicted operating point and the ideal shift line in the shift map, where predicted vehicle speed VSP2 is a vehicle speed at a future time instant a predetermined period after the current time instant. Specifically, a shift command is issued, when the predicted operating point according to predicted vehicle speed VSP2 passes the shift line. The shifting operation is completed when the operating point according to measured vehicle speed VSP passes the ideal shift line a predetermined time period after the current time instant, because predicted vehicle speed VSP2 is calculated in consideration of driving conditions of the vehicle.

Figure 3:
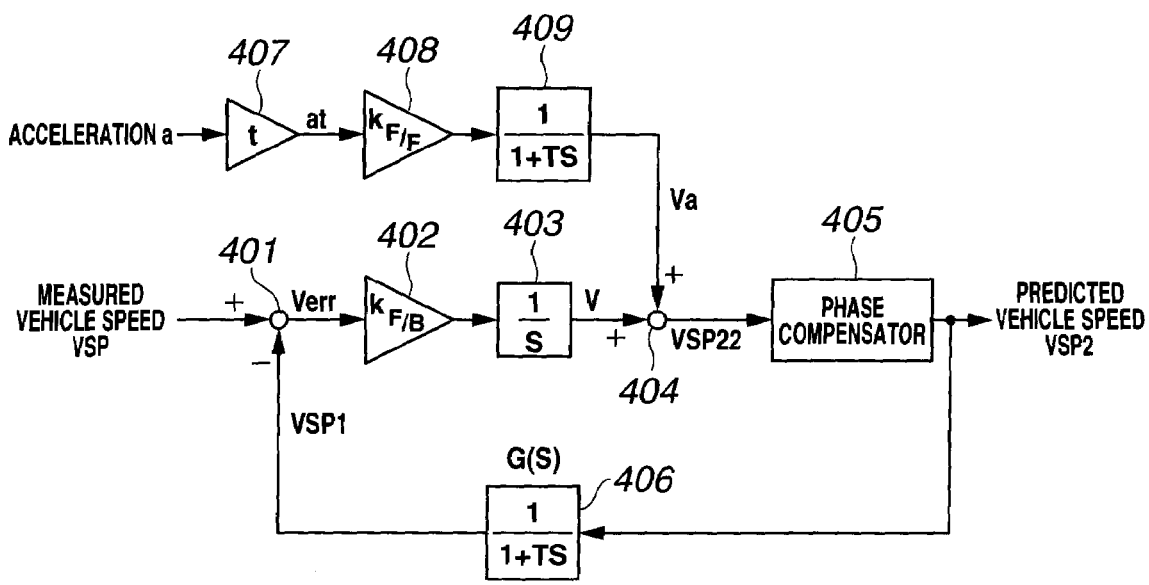
FIG. 3 is a block diagram showing a process of calculation of a predicted vehicle speed, which is carried out by a vehicle speed calculator of the automatic transmission controller.

FIG. 3 shows a process of calculation of predicted vehicle speed VSP2, which is carried out by vehicle speed estimator of vehicle speed calculator 4. Vehicle speed estimator 4a includes an integrator 403 and a first order delay filter 406. An estimated vehicle speed VSP1 is an estimated current vehicle speed calculated with reference to predicted vehicle speed VSP2. If measured vehicle speed VSP agrees with estimated vehicle speed VSP1, predicted vehicle speed VSP2 indicates a future vehicle speed at a future time instant according to a delay due to delay factors.

In vehicle speed estimator 4a, a vehicle speed error calculator 401 calculates a vehicle speed error "Verr" on the basis of measured vehicle speed VSP and estimated vehicle speed VSP1 using equation (1).

$$\text{Verr} = \text{VSP} - \text{VSP1} \tag{1}$$

A feedback gain multiplier 402 multiplies vehicle speed error Verr by a feedback gain $k_{F/B}$.

Integrator 403 calculates an integral "V" by integrating $(k_{F/B} \cdot \text{Verr})$ using equation (2).

$$V = k_{F/B}(1/s) \tag{2}$$

where s represents the Laplace operator.

A time period multiplier 407 receives a measured vehicle acceleration obtained by acceleration sensor 3, and multiplies the measured vehicle acceleration by a time period "t" after which predicted vehicle speed VSP2 is to be calculated, to produce an acceleration component "at".

A feedforward gain multiplier 408 multiplies the acceleration component "at" by a feedforward gain $k_{F/F}$.

A vehicle speed converter 409 calculates an acceleration-component-based vehicle speed "Va" by applying a first order delay filter to $(at \cdot k_{F/F})$, where the first order delay filter is expressed by equation (3).

$$G(s) = 1/(Ts+1) \tag{3}$$

where T represents a time constant corresponding to a time after which predicted vehicle speed VSP2 is to be calculated.

A vehicle speed adder 404 calculates an uncompensated predicted vehicle speed VSP22 by adding integral V and acceleration-component-based vehicle speed Va using equation (4).

$$\text{VSP22} = V + \text{Va} \tag{4}$$

A phase compensator 405 calculates predicted vehicle speed VSP2 by applying a first order by first order phase compensator Gh(s) to uncompensated predicted vehicle speed VSP22, where the first order by first order phase compensator Gh(s) is expressed by equation (5).

$$Gh(s) = (T2s+1)/(T1s+1)$$

where T1, T2 represent phase compensation constants.

The provision of phase compensator 405 makes it possible to set three design parameters, or phase compensation constants T1, T2 and feedback gain $k_{F/B}$, where there are three unknown parameters, or a first order pole affecting the stability and response of the system, a specific frequency, and a damping ratio. Parameter setting may be implemented by a method disclosed in Japanese Patent Application Publication 9-210159.

First order delay filter 406 applies first order delay filter G(s) to predicted vehicle speed VSP2, where first order delay filter G(s) is expressed by equation (3). In other words, predicted vehicle speed VSP2 is multiplied by a delay factor, and thereby converted to a value of vehicle speed a predetermined time before the future time instant. Estimated vehicle speed VSP1 is thus calculated on the basis of predicted vehicle speed VSP2. When estimated vehicle speed VSP1 is equal to measured vehicle speed VSP, it is reasonably assumed that predicted vehicle speed VSP2 is correctly calculated. Otherwise, predicted vehicle speed VSP2 is corrected according to vehicle speed error Verr.

Figure 4:
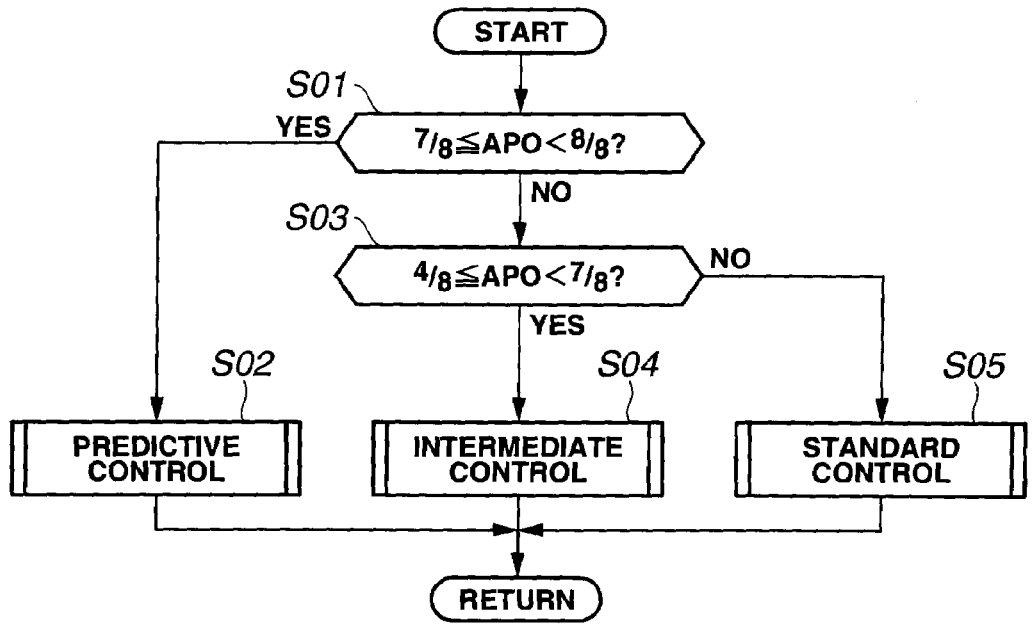
FIG. 4 is a flow chart showing a process of selecting one of three control modes according to accelerator pedal opening, which is carried out by the automatic transmission controller.

FIG. 4 shows a process of selecting one of three control modes according to accelerator pedal opening, which is carried out by automatic transmission controller ATCU. At Step S01, automatic transmission controller ATCU determines whether or not accelerator pedal opening APO is larger than or equal to ⅞. When the answer to Step S01 is affirmative (YES), then automatic transmission controller ATCU proceeds to Step S02. On the other hand, when the answer to Step S01 is negative (NO), then automatic transmission controller ATCU proceeds to Step S03. At Step S02, automatic transmission controller ATCU enters a predictive control mode in which predicted vehicle is speed VSP2 is calculated and referred to as reference vehicle speed SftVSP. At Step S03, automatic transmission controller ATCU determines whether or not accelerator pedal opening APO is larger than or equal to ⅘ and smaller than ⅞. When the answer to Step S03 is YES, then automatic transmission controller ATCU proceeds to Step S04. On the other hand, when the answer to Step S03 is NO, then automatic transmission controller ATCU proceeds to Step S05. At Step S04, automatic transmission controller ATCU enters an intermediate control mode in which weighted vehicle speed VSP0 is calculated and referred to as reference vehicle speed SftVSP. At Step S05, automatic transmission controller ATCU enters a standard control mode in which measured vehicle speed VSP is referred to as reference vehicle speed SftVSP.

Figure 5:
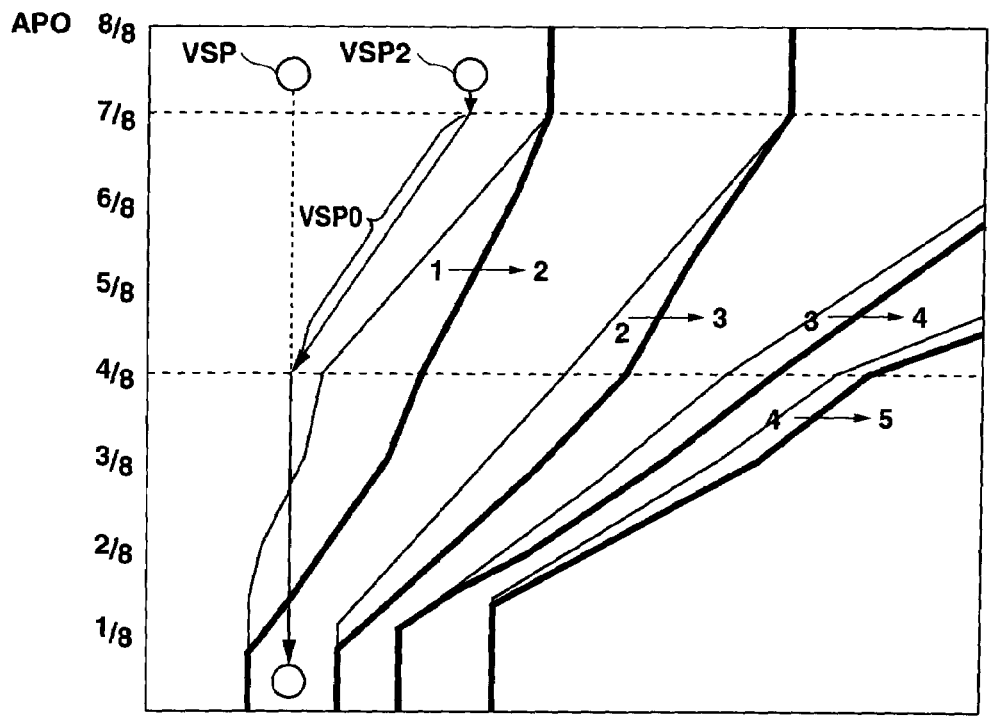
FIG. 5 is a graphic diagram showing a process of controlling shifts of the automatic transmission, which is carried out by the automatic transmission controller.

FIG. 5 graphically shows a process of controlling a shift of automatic transmission AT, which is carried out by automatic transmission controller ATCU. In FIG. 5, the reference operating point moves as follows. When the accelerator pedal is released in the predictive control area (APO≧⅞) so that the reference operating point moves into the intermediate control area, weighted vehicle speed VSP0 is started to be referred to as reference vehicle speed SftVSP for shift control.

Weighted vehicle speed VSP0, which is calculated according to accelerator pedal opening APO, gradually decreases from predicted vehicle speed VSP2 to measured vehicle speed VSP. In the case of FIG. 5, weighted vehicle speed VSP0 as reference vehicle speed SftVSP passes no shift line in the shift map.

After accelerator pedal opening APO decreases below ⅘ so that the operating point enters the standard control area, measured vehicle speed VSP is started to be referred to as reference vehicle speed SftVSP for shift control. In the case of FIG. 5, when the reference operating point passes the first to second shift line, a shift command is issued. Although the three control modes are used internally, no undesirable shift command against driver's intention is issued. Accordingly, automatic transmission controller ATCU of this embodiment achieves a suitable shift control without making a driver uncomfortable.

Figure 6:
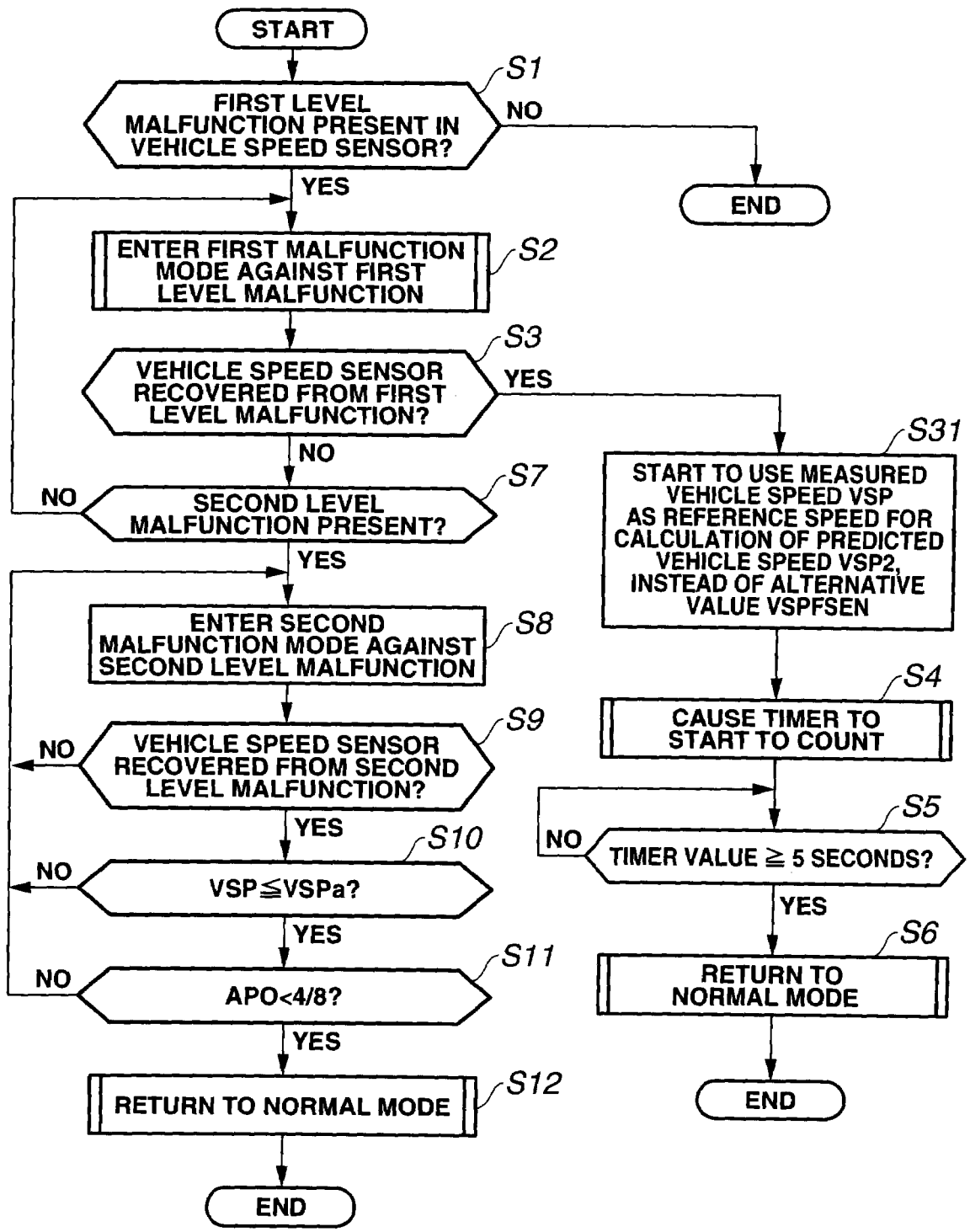
FIG. 6 is a flow chart showing a control process for handling malfunctions of a vehicle speed sensor, which is carried out by the automatic transmission controller.

FIG. 6 shows a control process for handling malfunctions of vehicle speed sensor 1, which is carried out by automatic transmission controller ATCU. At Step S1, automatic transmission controller ATCU determines whether or not a first level malfunction is present in vehicle speed sensor 1. When the answer to Step S1 is YES, automatic transmission controller ATCU proceeds to Step S2. On the other hand, when the answer to Step S1 is NO, automatic transmission controller ATCU returns from this control process. Automatic transmission controller ATCU determines that the first level malfunction is present in vehicle speed sensor 1, when detecting that the signal of measured vehicle speed VSP outputted from vehicle speed sensor 1 continues to be absent for a predetermined time period of 0.1 second.

At Step S2, automatic transmission controller ATCU enters a first malfunction mode against the first level malfunction. In the first malfunction mode, automatic transmission controller ATCU stores, as alternative value VSPFSEN, the last value of measured vehicle speed VSP immediately before the signal from vehicle speed sensor 1 becomes absent, and vehicle speed estimator 4a continues calculation of predicted vehicle speed VSP2 on the basis of alternative value VSPFSEN instead of measured vehicle speed VSP. Vehicle speed calculator 4 outputs alternative value VSPFSEN as reference vehicle speed SftVSP. The values carried by the signal of vehicle speed sensor 1 during several control cycles are stored in a memory not shown, and constantly updated, for use as alternative value VSPFSEN.

At Step S3, automatic transmission controller ATCU determines whether or not vehicle speed sensor 1 is recovered from the first level malfunction so that the sensor signal from vehicle speed sensor 1 restarts to be inputted into automatic transmission controller ATCU.

When the answer to Step S3 is YES, then automatic transmission controller ATCU proceeds to Step S31. On the other hand, when the answer to Step S3 is NO, then automatic transmission controller ATCU proceeds to Step S7.

At Step S31, automatic transmission controller ATCU starts to use measured vehicle speed VSP as a reference speed for calculation of predicted vehicle speed VSP2 instead of alternative value VSPFSEN.

At Step S4, automatic transmission controller ATCU causes a timer to start to count. Then, at Step S5, automatic transmission controller ATCU determines whether or not the timer value exceeds a predetermined time period such as 4 seconds. When the answer to Step S5 is YES, then automatic transmission controller ATCU proceeds to Step S6. On the other hand, when the answer to Step S5 is NO, then automatic transmission controller ATCU causes the timer to continue to count.

At Step S6, automatic transmission controller ATCU returns to a normal mode. In the normal mode, when accelerator pedal opening APO is larger than ⅘, automatic transmission controller ATCU allows vehicle speed calculator 4 to output predicted vehicle speed VSP2 or weighted vehicle speed VSP0 as reference vehicle speed SftVSP instead of alternative value VSPFSEN. Since vehicle speed estimator 4a has continued calculation of predicted vehicle speed VSP2 with reference to measured vehicle speed VSP for a time period of 4 seconds or so after the recovery from the first level malfunction, predicted vehicle speed VSP2 is already converged to a correct value at this time instant through calculation. Accordingly, the switch from alternative value VSPFSEN to predicted vehicle speed VSP2 or weighted vehicle speed VSP0 does not make a driver uncomfortable. When accelerator pedal opening APO is smaller than ⅘, automatic transmission controller ATCU allows vehicle speed calculator 4 to output measured vehicle speed VSP as reference vehicle speed SftVSP instead of alternative value VSPFSEN.

At Step S7, automatic transmission controller ATCU determines whether or not a second level malfunction is present in vehicle speed sensor 1. When the answer to Step S7 is YES, then automatic transmission controller ATCU proceeds to Step S8. Automatic transmission controller ATCU determines that the second level malfunction is present in vehicle speed sensor 1, when detecting that the signal of measured vehicle speed VSP outputted from vehicle speed sensor 1 continues to be absent for a predetermined time period of 3 seconds.

At Step S8, automatic transmission controller ATCU enters a second malfunction mode against the second level malfunction. In the second malfunction mode, the calculation of predicted vehicle speed VSP2 in vehicle speed estimator 4a is inhibited. This is effective for avoiding a problem that continuation of calculation of predicted vehicle speed VSP2 with reference to alternative value VSPFSEN causes a large error between a calculated value of predicted vehicle speed VSP2 and a correct value of predicted vehicle speed VSP2, due to increase of the error between measured vehicle speed VSP and alternative value VSPFSEN, and thereby requires a long period of time for convergence of predicted vehicle speed VSP2.

In the second malfunction mode, automatic transmission controller ATCU outputs secondary measured vehicle speed VI as reference vehicle speed SftVSP, where secondary measured vehicle speed VI is based on the measurement of wheel speed sensor WS. Moreover, target transmission ratio calculator 5 selects the smaller one of the sensor signal of accelerator pedal opening APO by accelerator pedal opening sensor 2 and the value of 4/8 as a threshold value between the standard control area and the intermediate control area, and calculates a target transmission ratio according to the selected accelerator pedal opening. In other words, target transmission ratio calculator 5 calculates the target transmission ratio, under the assumption that the accelerator pedal opening is limited within an upper bound of 4/8.

The limitation of accelerator pedal opening APO is provided for the following reasons. In the predictive control area and the intermediate control area in the shift map, the shift lines are defined under the assumption that predicted vehicle speed VSP2 is correctly calculated. When predicted vehicle speed VSP2 is incorrectly calculated, it is difficult to achieve an optimized shift control. In such cases, it is preferable to employ the standard control mode in which the shift control is performed with reference to measured vehicle speed VSP and without reference to predicted vehicle speed VSP2. The limitation of accelerator pedal opening APO is thus effective for constantly using the standard control mode.

At Step S9, automatic transmission controller ATCU determines whether or not vehicle speed sensor 1 is recovered from the first level malfunction so that the sensor signal from vehicle speed sensor 1 restarts to be inputted into automatic transmission controller ATCU. When the answer to Step S9 is YES, then automatic transmission controller ATCU proceeds to Step S10. On the other hand, when the answer to Step S9 is NO, then automatic transmission controller ATCU repeats the second malfunction mode at Step S8.

At Step S10, automatic transmission controller ATCU determines whether or not measured vehicle speed VSP obtained by vehicle speed sensor 1 is lower than or equal to a recovery permission speed "VSPa" such as 5 km/h. When the answer to Step S10 is YES, then automatic transmission controller ATCU proceeds to Step S11. On the other hand, when the answer to Step S10 is NO, then automatic transmission controller ATCU repeats the second malfunction mode at Step S8. When the vehicle speed is below recovery permission speed VSPa, the first transmission ratio is to be selected basically with no reference to accelerator pedal opening APO. This is effective for preventing unnecessary rapid shifts, and keeping a driver comfortable.

At Step S11, automatic transmission controller ATCU determines whether or not accelerator pedal opening APO obtained by accelerator pedal opening sensor 2 is smaller than a recovery permission opening of 4/8. When the answer to Step S11 is YES, then automatic transmission controller ATCU proceeds to Step S12. On the other hand, when the answer to Step S11 is NO, then automatic transmission controller ATCU repeats the second malfunction mode at Step S8. When accelerator pedal opening APO is smaller than 4/8, the shift control is carried out with no reference to predicted vehicle speed VSP2. This is also effective for preventing unnecessary rapid shifts, and keeping a driver comfortable.

At Step S12, automatic transmission controller ATCU returns to the normal mode. Specifically, automatic transmission controller ATCU restarts calculation of predicted vehicle speed VSP2 which is inhibited temporarily, and restarts the normal shift control with reference to predicted vehicle speed VSP2. In this way, a smooth return to the normal mode is implemented by the return when the vehicle speed is in a low speed range, and the operating point is in the standard control area in which predicted vehicle speed VSP2 is not used. Although predicted vehicle speed VSP2 is not referred to in calculation of transmission ratio, calculation of predicted vehicle speed VSP2 is already restarted under the condition of low vehicle speed and smaller accelerator pedal opening. Accordingly, when accelerator pedal opening APO increases so that the operating point reenters the areas where predicted vehicle speed VSP2 is referred to, it is possible to use predicted vehicle speed VSP2 without any delay, because predicted vehicle speed VSP2 is already sufficiently converged.

FIGS. 7A, 7B, 7C and 7D are time charts showing an example of how automatic transmission controller ATCU operates when a temporary malfunction occurs in vehicle speed sensor 1. In this example, the control process proceeds through Steps S1, S3, S31 and S6, under condition that a first level malfunction occurs, and then vehicle speed sensor 1 is recovered from the first level malfunction without falling in a second level malfunction. FIG. 7A also shows a comparative example in which when a temporary malfunction is present, calculation of predicted vehicle speed VSP2 is continued on the basis of the signal from vehicle speed sensor 1. In FIG. 7A, a bold solid line indicates a sensor value from vehicle speed sensor 1, a bold long dashed short dashed line indicates a reference vehicle speed for calculation of predicted vehicle speed VSP2, a narrow dotted line indicates predicted vehicle speed VSP2 in the comparative example, a narrow solid line indicates predicted vehicle speed VSP2 in the present embodiment, a narrow long dashed double short dashed line indicates actual future vehicle speed VSP*, and a narrow long dashed short dashed line indicates reference vehicle speed SftVSP.

At a time instant t0, a temporary malfunction occurs. When the signal from vehicle speed sensor 1 is absent for a time period of 0.1 second or more, automatic transmission controller ATCU determines that a first level malfunction is present in vehicle speed sensor 1, sets reference vehicle speed SftVSP to alternative value VSPFSEN which is a value of measured vehicle speed VSP memorized immediately before the temporary malfunction occurs, and uses alternative value VSPFSEN for calculation of predicted vehicle speed VSP2 instead of measured vehicle speed VSP.

At a time instant t2, vehicle speed sensor 1 is recovered from the first level malfunction, so as to restart to output the signal. In response, automatic transmission controller ATCU immediately restarts to use measured vehicle speed VSP for calculation of predicted vehicle speed VSP2, but continues to use alternative value VSPFSEN as reference vehicle speed SftVSP. Simultaneously, the timer is caused to start to count.

In the comparative example, during time instant t1 to time instant t2, calculation of predicted vehicle speed VSP2 is continued with reference to the signal from vehicle speed sensor 1 which is failed. This increases vehicle speed error Verr, and thereby significantly reduces predicted vehicle speed VSP2. At time instant t2 when the signal from vehicle speed sensor 1 becomes normal, vehicle speed error Verr gets large, because predicted vehicle speed VSP2 is fallen after time instant t1, as shown in FIG. 7A. As a result, predicted vehicle speed VSP2 significantly overshoots actual future vehicle speed VSP* due to the integral component based on vehicle speed error Verr. Predicted vehicle speed VSP2 thus shows undesirable convergence in the comparative example.

In contrast, in the present embodiment, vehicle speed error Verr increases but is smaller than in the comparative example, because predicted vehicle speed VSP2 is calculated with reference to alternative value VSPFSEN instead of measured vehicle speed VSP. Vehicle speed error Verr is also small at time instant t2 when the signal from vehicle speed sensor 1 becomes normal. Predicted vehicle speed VSP2 thus shows desirable convergence without significantly overshooting actual future vehicle speed VSP* according to this embodiment.

At a time instant t3, automatic transmission controller ATCU assumes that measured vehicle speed VSP is sufficiently converged, when the count value of the counter reaches the predetermined time period which is 4 seconds in this example. Thereafter, the normal mode is recovered so that reference vehicle speed SftVSP is changed from alternative value VSPFSEN to one of predicted vehicle speed VSP2, measured vehicle speed VSP, and weighted vehicle speed VSP0, according to accelerator pedal opening APO.

In the comparative example, if accelerator pedal opening APO is large, setting of reference vehicle speed SftVSP to predicted vehicle speed VSP2 may cause shift hunching, because predicted vehicle speed VSP2 shows undesirable convergence and large amplitudes.

In contrast, in the present embodiment, use of predicted vehicle speed VSP2 which is sufficiently converged during the predetermined time period (4 seconds) measured by the timer, can achieve a stable shift control without causing shift hunching so as to make a driver uncomfortable.

The automatic transmission controller and automatic transmission control method according to the present embodiment produce at least advantageous effects described below.

<1> In the present embodiment, an automatic transmission controller (ATCU) for an automatic transmission (AT), comprises: a sensor input state evaluator (sensor input state evaluation means) 7 configured to determine whether a sensor input signal (outputted from vehicle speed sensor 1) is normal or abnormal, wherein the sensor input signal (1) carries information about a measured vehicle state variable (measured vehicle speed VSP); a vehicle speed calculator (vehicle speed calculation means) 4 configured to: calculate a predicted vehicle speed (VSP2) with reference to the measured vehicle state variable (VSP), in response to determination that the sensor input signal (1) is normal; calculate the predicted vehicle speed (VSP2) with reference to a first alternative value (VSPFSEN) instead of the measured vehicle state variable (VSP), in response to determination that the sensor input signal (1) is abnormal; and calculate the predicted vehicle speed (VSP2) with reference to the measured vehicle state variable (VSP), in response to determination that the sensor input signal (1) becomes normal after abnormal; a target transmission ratio calculator (target transmission ratio calculation means) 5 configured to: calculate a target transmission ratio with reference to the predicted vehicle speed (VSP2), in response to determination that the sensor input signal (1) is normal; calculate the target transmission ratio with reference to a second alternative value (VSPFSEN) instead of the predicted vehicle speed (VSP2), in response to determination that the sensor input signal (1) is abnormal; calculate the target transmission ratio with reference to the second alternative value (VSPFSEN) instead of the predicted vehicle speed (VSP2), in response to determination that a predetermined condition (related to time instant t3) is unsatisfied after the sensor input signal (1) becomes normal after abnormal; and calculate the target transmission ratio with reference to the predicted vehicle speed (VSP2), in response to determination that the predetermined condition (t3) is satisfied after the sensor input signal (1) becomes normal after abnormal; and a transmission ratio controller (transmission ratio regulation means, or transmission ratio regulator 6) configured to control the automatic transmission (AT) with reference to the target transmission ratio. The vehicle speed calculator (4) is further configured to set the first alternative value (VSPFSEN) with reference to a measured vehicle driving state (such as measured vehicle speed VSP) when it is determined that the sensor input signal (1) becomes abnormal. The target transmission ratio calculator (5) is further configured to set the second alternative value (VSPFSEN) with reference to a measured vehicle driving state (such as measured vehicle speed VSP) when it is determined that the sensor input signal (1) becomes abnormal. The measured vehicle state variable is a measured vehicle speed (VSP). The automatic transmission (AT) shifts a ratio in rotational speed between an input shaft (IN) and an output shaft (OUT); the input shaft (IN) is connected to a vehicle driving source (engine E); the output shaft (OUT) is connected to a vehicle driving wheel set (RL, RR); the automatic transmission controller (ATCU) further comprises a vehicle speed sensor (1) configured to measure an actual vehicle speed as the measured vehicle speed (VSP); and the vehicle speed calculator (4) includes: a vehicle speed error calculator (vehicle speed error calculation means) 401 configured to calculate a vehicle speed error (Verr) between the measured vehicle speed (VSP) and an estimated vehicle speed (VSP1); a predicted vehicle speed calculator (vehicle speed adder 404, and phase compensator 405) configured to calculate the predicted vehicle speed (VSP2) with reference to an integral of the vehicle speed error (Verr) multiplied by a predetermined gain (feedback gain multiplier 402), wherein the predicted vehicle speed (VSP2) is a predicted value of a future vehicle speed a predetermined time period after a current time instant; and an estimated vehicle speed calculator (first order delay filter 406) configured to calculate the estimated vehicle speed (VSPL) with reference to the predicted vehicle speed (VSP2) by applying a delay factor to the predicted vehicle speed (VSP2), wherein the delay factor simulates a predetermined delay response. This automatic transmission controller (ATCU) is effective for preventing the automatic transmission (AT) from rapidly shifting in response to events that the sensor input signal (1) becomes abnormal. The calculation of the predicted vehicle speed (VSP2) with reference to the first alternative value (VSPFSEN) instead of the measured vehicle state variable (measured vehicle speed VSP) in response to determination that the sensor input signal (1) is abnormal, is effective for maintaining small an error between a value of the predicted vehicle speed (VSP2) calculated when the sensor input signal (1) is abnormal, and a value of the predicted vehicle speed (VSP2) calculated if the sensor input signal (1) were normal, and thereby quickly conversing the predicted vehicle speed (VSP2) to a correct value after the sensor input signal (1) becomes normal. The automatic transmission controller (ATCU) achieves a preferable shift control in conformance with driver's intention.

<2> In the present embodiment, the first alternative value (VSPFSEN) is a value of the measured vehicle state variable (measured vehicle speed VSP) which is last obtained while it is determined that the sensor input signal (1) is normal. This feature is effective for minimizing an increase in the vehicle speed error (Verr) when the sensor input signal (1) becomes abnormal so that the measured vehicle state variable (measured vehicle speed VSP) suddenly becomes an abnormal value such as zero, and thereby quickly conversing the predicted vehicle speed (VSP2) to a correct value after the sensor input signal (1) becomes normal.

<3> In the present embodiment, the predetermined condition is a condition that a first predetermined time period (for example, 4 seconds) is elapsed after determination that the sensor input signal (1) becomes normal after abnormal. This feature is effective for sufficiently converging the predicted vehicle speed (VSP2) to a correct value before return to calculation of the target transmission ratio with reference to the predicted vehicle speed (VSP2), and thereby allowing return to the normal mode without making a driver uncomfortable.

<4> In the present embodiment, the target transmission ratio calculator (5) is further configured to: calculate the target transmission ratio with reference to the measured vehicle speed (VSP), in response to determination that a measured vehicle driving state is within a predetermined region; calculate the target transmission ratio with reference to the predicted vehicle speed (VSP2), in response to determination that the measured vehicle driving state is out of the predetermined region; calculate the target transmission ratio without reference to the predicted vehicle speed (VSP2), in response to determination that the sensor input signal (1) continues to be abnormal for a second predetermined time period (such as 3 seconds) after the sensor input signal (1) becomes abnormal after normal; and calculate the target transmission ratio with reference to the predicted vehicle speed (VSP2), in response to determination that the sensor input signal (1) becomes normal after abnormal, and the measured vehicle driving state is within the predetermined region. This feature is effective for preventing the target transmission ratio from being incorrectly calculated with reference to the predicted vehicle speed (VSP2) under a condition, such as a condition of the second level malfunction, that the sensor input signal (1) is unavailable for a long time period so that the calculated value of the predicted vehicle speed (VSP2) is significantly deviated from a correct value.

In the predictive control area and the intermediate control area, shift lines are defined under the assumption that the predicted vehicle speed (VSP2) is correctly calculated. Accordingly, when the predicted vehicle speed (VSP2) is incorrectly calculated, the automatic transmission controller (ATCU) may perform an undesirable shift control with reference to the predicted vehicle speed (VSP2). This is prevented by the feature of calculating the target transmission ratio with reference to the measured vehicle speed (VSP) without reference to the predicted vehicle speed (VSP2).

The feature of calculating the target transmission ratio with reference to the predicted vehicle speed (VSP2), in response to determination that the sensor input signal (1) becomes normal after abnormal, and the measured vehicle driving state is within the predetermined region, is effective for minimizing effects caused from a gap of the reference vehicle speed (SftVSP) which is caused when the predicted vehicle speed (VSP2) is not sufficiently converged soon, because the return to the normal mode is performed in the predetermined region in which the predicted vehicle speed (VSP2) is not referred to in calculation of the target transmission ratio, and thereby implementing a smooth return to the normal mode while preventing unnecessary shifts.

<5> In the present embodiment, the automatic transmission controller (ATCU) further comprises an accelerator pedal opening sensor (2) configured to measure an accelerator pedal opening (APO); and the predetermined region is a region in which the accelerator pedal opening (APO) is below a predetermined possible intermediate value such as 4/8. This feature is effective for minimizing effects caused from a gap of the reference vehicle speed (SftVSP) which is caused when the predicted vehicle speed (VSP2) is not sufficiently converged soon, because the return to the normal mode is performed in the predetermined region in which the accelerator pedal opening (APO) is small, and the predicted vehicle speed (VSP2) is not referred to in calculation of the target transmission ratio, and thereby implementing a smooth return to the normal mode while preventing unnecessary shifts.

<6> In the present embodiment, the predetermined region is a region in which the measured vehicle speed (VSP) is below a predetermined possible intermediate value (recovery permission speed VSPa such as 5 km/h). This feature is effective for returning to the normal mode in the region in which the automatic transmission (AT) is not shifted from the lowest transmission ratio, without causing sudden shifts due to the return and making a driver uncomfortable.

The foregoing embodiment may be variously modified as follows, for example. Although the signal of vehicle speed sensor 1 is checked in the present embodiment, other sensors such as engine speed sensor E1, turbine speed sensor E2, throttle valve opening sensor E3, engine controller ECU (as torque sensor), and acceleration sensor 3, may be checked similarly in cases the signals of the sensors are used for calculation of predicted vehicle speed VSP2.

In the foregoing embodiment, predicted vehicle speed VSP2 is calculated also with reference to the signal from acceleration sensor 3. Accordingly, when a temporary malfunction occurs in acceleration sensor 3, the accuracy of predicted vehicle speed VSP2 may be adversely affected. Automatic transmission controller ATCU may be configured to store the sensor value of acceleration sensor 3, continue calculation of predicted vehicle speed VSP2 with reference to the stored sensor value as an alternative value during the temporary malfunction, and restart to calculate the target transmission ratio with reference to predicted vehicle speed VSP2 a predetermined time period after the signal of acceleration sensor 3 restarts to be inputted.

Calculation of predicted vehicle speed VSP2 is inhibited, when the signal from vehicle speed sensor 1 continues to be absent for a predetermined time period in the present embodiment. This may be applied to other sensors whose signals are used for calculation of predicted vehicle speed VSP2, so that when the input signal of one of the sensors is abnormal, calculation of predicted vehicle speed VSP2 may be inhibited, when the signal from the sensor continues to be absent for a predetermined time period.

In summary, the automatic transmission controller (ATCU) may be modified so that: the automatic transmission controller (ATCU) further comprises a second sensor (acceleration sensor 3) configured to measure a second measured vehicle state variable (acceleration component at); the sensor input state evaluator (7) is configured to determine whether the sensor input signal (1) as a first sensor input signal is normal or abnormal, and determine whether a second sensor input signal (from acceleration sensor 3) is normal or abnormal, wherein the second sensor input signal (3) carries information about the second measured vehicle state variable (at); the vehicle speed calculator (4) is configured to: calculate the predicted vehicle speed (VSP2) with reference to the measured vehicle speed (VSP) and the second measured vehicle state variable (at), in response to determination that the first sensor input signal (1) and the second sensor input signal (3) are normal; calculate the predicted vehicle speed (VSP2) with reference to a third alternative value instead of the second measured vehicle state variable (at), in response to determination that the second sensor input signal (3) is abnormal; and calculate the predicted vehicle speed (VSP2) with reference to the second measured vehicle state variable (at), in response to determination that the second sensor input signal (3) becomes normal after abnormal; and the target transmission ratio calculator (5) is configured to calculate the target transmission ratio with reference to the predicted vehicle speed (VSP2) and the second measured vehicle state variable (at), in is response to determination that the first sensor input signal (1) and the second sensor input signal (3) are normal.

The condition for return to the normal mode includes the condition of accelerator pedal opening APO in the present embodiment. This condition may include conditions for other parameters indicative of driving states of the vehicle.

In the present embodiment, during the first level malfunction, alternative value VSPFSEN is used both for calculation of predicted vehicle speed VSP2, and as reference vehicle speed SftVSP for shift control. However, automatic transmission controller ATCU may use a first alternative value for calculation of predicted vehicle speed VSP2, and a second alternative value as reference vehicle speed SftVSP for shift control, wherein the first alternative value is different from the second alternative value with a relative offset.

Although the present embodiment is applied to a stepwise transmission ratio automatic transmission, but may be applied to continuously variable transmissions.

The entire contents of Japanese Patent Application 2008-085122 filed Mar. 28, 2008 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An automatic transmission controller for an automatic transmission, comprising:
   a sensor input state evaluator configured to determine whether a sensor input signal is normal or abnormal, wherein the sensor input signal carries information about a measured vehicle state variable;
   a vehicle speed calculator configured to:
      calculate a predicted vehicle speed with reference to the measured vehicle state variable, in response to determination that the sensor input signal is normal;
      calculate the predicted vehicle speed with reference to a first alternative value instead of the measured vehicle state variable, in response to determination that the sensor input signal is abnormal; and
      calculate the predicted vehicle speed with reference to the measured vehicle state variable, in response to determination that the sensor input signal becomes normal after abnormal;
   a target transmission ratio calculator configured to:
      calculate a target transmission ratio with reference to the predicted vehicle speed, in response to determination that the sensor input signal is normal;
      calculate the target transmission ratio with reference to a second alternative value instead of the predicted vehicle speed, in response to determination that the sensor input signal is abnormal;
      calculate the target transmission ratio with reference to the second alternative value instead of the predicted vehicle speed, in response to determination that a predetermined condition is unsatisfied after the sensor input signal becomes normal after abnormal; and
      calculate the target transmission ratio with reference to the predicted vehicle speed, in response to determination that the predetermined condition is satisfied after the sensor input signal becomes normal after abnormal; and
   a transmission ratio controller configured to control the automatic transmission with reference to the target transmission ratio.

2. The automatic transmission controller as claimed in claim 1, wherein the measured vehicle state variable is a measured vehicle speed.

3. The automatic transmission controller as claimed in claim 2, wherein:
   the automatic transmission shifts a ratio in rotational speed between an input shaft and an output shaft;
   the input shaft is connected to a vehicle driving source;
   the output shaft is connected to a vehicle driving wheel set;
   the automatic transmission controller further comprises a vehicle speed sensor configured to measure an actual vehicle speed as the measured vehicle speed; and
   the vehicle speed calculator includes:
      a vehicle speed error calculator configured to calculate a vehicle speed error between the measured vehicle speed and an estimated vehicle speed;
      a predicted vehicle speed calculator configured to calculate the predicted vehicle speed with reference to an integral of the vehicle speed error multiplied by a predetermined gain, wherein the predicted vehicle speed is a predicted value of a future vehicle speed a predetermined time period after a current time instant; and
      an estimated vehicle speed calculator configured to calculate the estimated vehicle speed with reference to the predicted vehicle speed by applying a delay factor to the predicted vehicle speed, wherein the delay factor simulates a predetermined delay response.

4. The automatic transmission controller as claimed in claim 3, wherein:
   the automatic transmission controller further comprises a second sensor configured to measure a second measured vehicle state variable;
   the sensor input state evaluator is configured to determine whether the sensor input signal as a first sensor input signal is normal or abnormal, and determine whether a second sensor input signal is normal or abnormal, wherein the second sensor input signal carries information about the second measured vehicle state variable;
   the vehicle speed calculator is configured to:
      calculate the predicted vehicle speed with reference to the measured vehicle speed and the second measured vehicle state variable, in response to determination that the first sensor input signal and the second sensor input signal are normal;

calculate the predicted vehicle speed with reference to a third alternative value instead of the second measured vehicle state variable, in response to determination that the second sensor input signal is abnormal; and calculate the predicted vehicle speed with reference to the second measured vehicle state variable, in response to determination that the second sensor input signal becomes normal after abnormal; and the target transmission ratio calculator is configured to calculate the target transmission ratio with reference to the predicted vehicle speed and the second measured vehicle state variable, in response to determination that the first sensor input signal and the second sensor input signal are normal.

5. The automatic transmission controller as claimed in claim 2, wherein the first alternative value is a value of the measured vehicle state variable which is last obtained while it is determined that the sensor input signal is normal.

6. The automatic transmission controller as claimed in claim 2, wherein:

the target transmission ratio calculator is further configured to:

calculate the target transmission ratio with reference to the measured vehicle speed, in response to determination that a measured vehicle driving state is within a predetermined region;

calculate the target transmission ratio with reference to the predicted vehicle speed, in response to determination that the measured vehicle driving state is out of the predetermined region;

calculate the target transmission ratio without reference to the predicted vehicle speed, in response to determination that the sensor input signal continues to be abnormal for a second predetermined time period after the sensor input signal becomes abnormal after normal; and calculate the target transmission ratio with reference to the predicted vehicle speed, in response to determination that the sensor input signal becomes normal after abnormal, and the measured vehicle driving state is within the predetermined region.

7. The automatic transmission controller as claimed in claim 6, wherein:

the automatic transmission controller further comprises an accelerator pedal opening sensor configured to measure an accelerator pedal opening; and the predetermined region is a region in which the accelerator pedal opening is below a predetermined possible intermediate value.

8. The automatic transmission controller as claimed in claim 6, wherein the predetermined region is a region in which the measured vehicle speed is below a predetermined possible intermediate value.

9. The automatic transmission controller as claimed in claim 1, wherein:

the sensor input state evaluator is configured to determine whether the sensor input signal as a first sensor input signal is normal or abnormal, and determine whether a second sensor input signal is normal or abnormal, wherein the first sensor input signal carries information about the measured vehicle state variable as a first measured vehicle state variable, and the second sensor input signal carries information about a second measured vehicle state variable;

the vehicle speed calculator is configured to:

calculate the predicted vehicle speed with reference to the first measured vehicle state variable and the second measured vehicle state variable, in response to determination that the first sensor input signal and the second sensor input signal are normal;

calculate the predicted vehicle speed with reference to a third alternative value instead of the second measured vehicle state variable, in response to determination that the second sensor input signal is abnormal; and calculate the predicted vehicle speed with reference to the second measured vehicle state variable, in response to determination that the second sensor input signal becomes normal after abnormal; and the target transmission ratio calculator is configured to:

calculate the target transmission ratio with reference to the predicted vehicle speed, in response to determination that the first sensor input signal and the second sensor input signal are normal;

calculate the target transmission ratio with reference to the second alternative value instead of the predicted vehicle speed, in response to determination that the second sensor input signal is abnormal;

calculate the target transmission ratio with reference to the second alternative value instead of the predicted vehicle speed, in response to determination that a second predetermined condition is unsatisfied after the second sensor input signal becomes normal after abnormal; and calculate the target transmission ratio with reference to the predicted vehicle speed, in response to determination that the second predetermined condition is satisfied after the second sensor input signal becomes normal after abnormal.

10. The automatic transmission controller as claimed in claim 1, wherein the vehicle speed calculator is further configured to set the first alternative value with reference to a measured vehicle driving state when it is determined that the sensor input signal becomes abnormal.

11. The automatic transmission controller as claimed in claim 1, wherein the first alternative value is a value of the measured vehicle state variable which is last obtained while it is determined that the sensor input signal is normal.

12. The automatic transmission controller as claimed in claim 1, wherein the target transmission ratio calculator is further configured to set the second alternative value with reference to a measured vehicle driving state when it is determined that the sensor input signal becomes abnormal.

13. The automatic transmission controller as claimed in claim 1, wherein the predetermined condition is a condition that a first predetermined time period is elapsed after determination that the sensor input signal becomes normal after abnormal.

14. An automatic transmission controller for an automatic transmission, comprising:

sensor input state evaluation means for determining whether a sensor input signal is normal or abnormal, wherein the sensor input signal carries information about a measured vehicle state variable;

vehicle speed calculation means for:

calculating a predicted vehicle speed with reference to the measured vehicle state variable, in response to determination that the sensor input signal is normal;

calculating the predicted vehicle speed with reference to a first alternative value instead of the measured vehicle state variable, in response to determination that the sensor input signal is abnormal; and calculating the predicted vehicle speed with reference to the measured vehicle state variable, in response to determination that the sensor input signal becomes normal after abnormal;

target transmission ratio calculation means for:
calculating a target transmission ratio with reference to the predicted vehicle speed, in response to determination that the sensor input signal is normal;
calculating the target transmission ratio with reference to a second alternative value instead of the predicted vehicle speed, in response to determination that the sensor input signal is abnormal;
calculating the target transmission ratio with reference to the second alternative value instead of the predicted vehicle speed, in response to determination that a predetermined condition is unsatisfied after the sensor input signal becomes normal after abnormal; and
calculating the target transmission ratio with reference to the predicted vehicle speed, in response to determination that the predetermined condition is satisfied after the sensor input signal becomes normal after abnormal; and transmission ratio control means for controlling the automatic transmission with reference to the target transmission ratio.

15. An automatic transmission control method for an automatic transmission, comprising:
determining whether a sensor input signal is normal or abnormal, wherein the sensor input signal carries information about a measured vehicle state variable;
calculating a predicted vehicle speed with reference to the measured vehicle state variable, in response to determination that the sensor input signal is normal;
calculating the predicted vehicle speed with reference to a first alternative value instead of the measured vehicle state variable, in response to determination that the sensor input signal is abnormal;
calculating the predicted vehicle speed with reference to the measured vehicle state variable, in response to determination that the sensor input signal becomes normal after abnormal;
calculating a target transmission ratio with reference to the predicted vehicle speed, in response to determination that the sensor input signal is normal;
calculating the target transmission ratio with reference to a second alternative value instead of the predicted vehicle speed, in response to determination that the sensor input signal is abnormal;
calculating the target transmission ratio with reference to the second alternative value instead of the predicted vehicle speed, in response to determination that a predetermined condition is unsatisfied after the sensor input signal becomes normal after abnormal;
calculating the target transmission ratio with reference to the predicted vehicle speed, in response to determination that the predetermined condition is satisfied after the sensor input signal becomes normal after abnormal; and
controlling the automatic transmission with reference to the target transmission ratio.

* * * * *